United States Patent
Adams et al.

(10) Patent No.: US 11,084,747 B2
(45) Date of Patent: Aug. 10, 2021

(54) DEWATERING APPARATUS, SYSTEMS, AND METHODS

(71) Applicant: ALFA LAVAL CORPORATE AB, Lund (SE)

(72) Inventors: Matthew Cody Adams, Houston, TX (US); Ross Lee Drescher, Houston, TX (US)

(73) Assignee: ALFA LAVAL CORPORATE AB, Lund (SE)

( * ) Notice: Subject to any disclaimer, the term of this patent is extended or adjusted under 35 U.S.C. 154(b) by 81 days.

(21) Appl. No.: 16/580,602

(22) Filed: Sep. 24, 2019

(65) Prior Publication Data
US 2021/0087094 A1 Mar. 25, 2021

(51) Int. Cl.
*C02F 11/121* (2019.01)
*B01D 33/04* (2006.01)

(52) U.S. Cl.
CPC ............ *C02F 11/121* (2013.01); *B01D 33/04* (2013.01)

(58) Field of Classification Search
USPC ............ 210/396, 400; 209/17, 272; 100/151
See application file for complete search history.

(56) References Cited

U.S. PATENT DOCUMENTS

| | | | |
|---|---|---|---|
| 2,097,529 A | 11/1937 | Nordell | |
| 3,984,329 A * | 10/1976 | Wenzel | B01D 33/58 210/396 |
| 4,244,287 A * | 1/1981 | Maffet | B01D 29/25 100/37 |
| 4,354,935 A * | 10/1982 | Austin | B01D 33/50 210/396 |
| 4,602,998 A * | 7/1986 | Goron | B01D 33/58 210/396 |
| 4,609,467 A * | 9/1986 | Morales | B01D 33/58 210/396 |
| 4,729,836 A | 3/1988 | Ickinger et al. | |
| 4,857,193 A | 8/1989 | Clements et al. | |
| 4,986,911 A * | 1/1991 | Goron | B01D 33/58 210/396 |
| 5,059,322 A * | 10/1991 | Austin | B01D 33/042 210/396 |

(Continued)

FOREIGN PATENT DOCUMENTS

| | | |
|---|---|---|
| CA | 2024780 C | 11/1999 |
| EP | 1464628 A1 | 10/2004 |

OTHER PUBLICATIONS

International Search Report and Written Opinion dated Jan. 14, 2021 for Application No. PCT/EP2020/075986.

(Continued)

*Primary Examiner* — Nina Bhat
(74) *Attorney, Agent, or Firm* — Patterson + Sheridan, LLP

(57) ABSTRACT

Aspects of the present application relate to dewatering methods, systems, apparatus, and associated components thereof. In one implementation, a plow for a sludge dewatering system includes a blade. The blade includes a leading edge, and a first wing swept downward in a vertical direction and outward in a first horizontal direction relative to the leading edge. The blade also includes a second wing swept downward in the vertical direction and outward in a second horizontal direction relative to the leading edge. The second horizontal direction is opposite of the first horizontal direction.

21 Claims, 8 Drawing Sheets

(56) References Cited

U.S. PATENT DOCUMENTS

| | | | | |
|---|---|---|---|---|
| 5,135,651 A * | 8/1992 | Austin | ................... | B01D 33/58 |
| | | | | 210/396 |
| 5,244,583 A * | 9/1993 | Goron | ................... | B01D 33/04 |
| | | | | 210/783 |
| 8,151,997 B2 * | 4/2012 | Marsh | ................... | B01D 33/04 |
| | | | | 210/400 |
| 10,035,720 B2 * | 7/2018 | Sugawara | ............. | C02F 11/123 |
| 2005/0252668 A1 | 11/2005 | Poutre | | |
| 2015/0197439 A1 * | 7/2015 | Zou | ........................... | C02F 1/56 |
| | | | | 106/501.1 |
| 2018/0346362 A1 * | 12/2018 | Sun | ..................... | B01D 29/014 |

OTHER PUBLICATIONS

Written Opinion of the International Preliminary Examining Authority dated Jun. 2, 2021 for Application No. PCT/EP2020/075986.

\* cited by examiner

DEWATERING APPARATUS, SYSTEMS, AND METHODS

BACKGROUND

Field

The present disclosure relates to dewatering methods, systems, apparatus, and associated components thereof.

Description of the Related Art

In dewatering sludge, such as sewage, it can be difficult to efficiently separate water from solids in the sludge. Conventional efforts attempt to move the sludge to separate water, but such efforts can be inefficient and may not effectively separate water from the sludge.

Therefore, there is a need for improved methods, apparatus, and systems that separate water from sludge.

SUMMARY

Implementations of the present disclosure relate to dewatering methods, systems, apparatus, and associated components thereof.

In one implementation, a plow for a sludge dewatering system includes a blade. The blade includes a leading edge, and a first wing swept downward in a vertical direction and outward in a first horizontal direction relative to the leading edge. The blade also includes a second wing swept downward in the vertical direction and outward in a second horizontal direction relative to the leading edge. The second horizontal direction is opposite of the first horizontal direction.

In one implementation, a plow for a sludge dewatering system includes a blade. The blade includes a leading edge, a first angled front surface, and a second angled front surface. Each of the first angled front surface and the second angled front surface angles outward in a first horizontal direction and a second horizontal direction, respectively, relative to a center axis of the leading edge to define a first angle in a horizontal plane. Each of the first angled front surface and the second angled front surface angles downward in a vertical direction relative to the leading edge to define a second angle in a vertical plane. The first angle is within a range of 45 degrees to 90 degrees. The second angle is within a range of 15 degrees to 70 degrees.

In one implementation, a plow for a sludge dewatering system includes a blade. The blade includes a leading edge on a leading side of the blade, a first wing, a second wing, and a cavity on a trailing side of the blade. The cavity is behind the first wing and the second wing, and between the first wing and the second wing.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
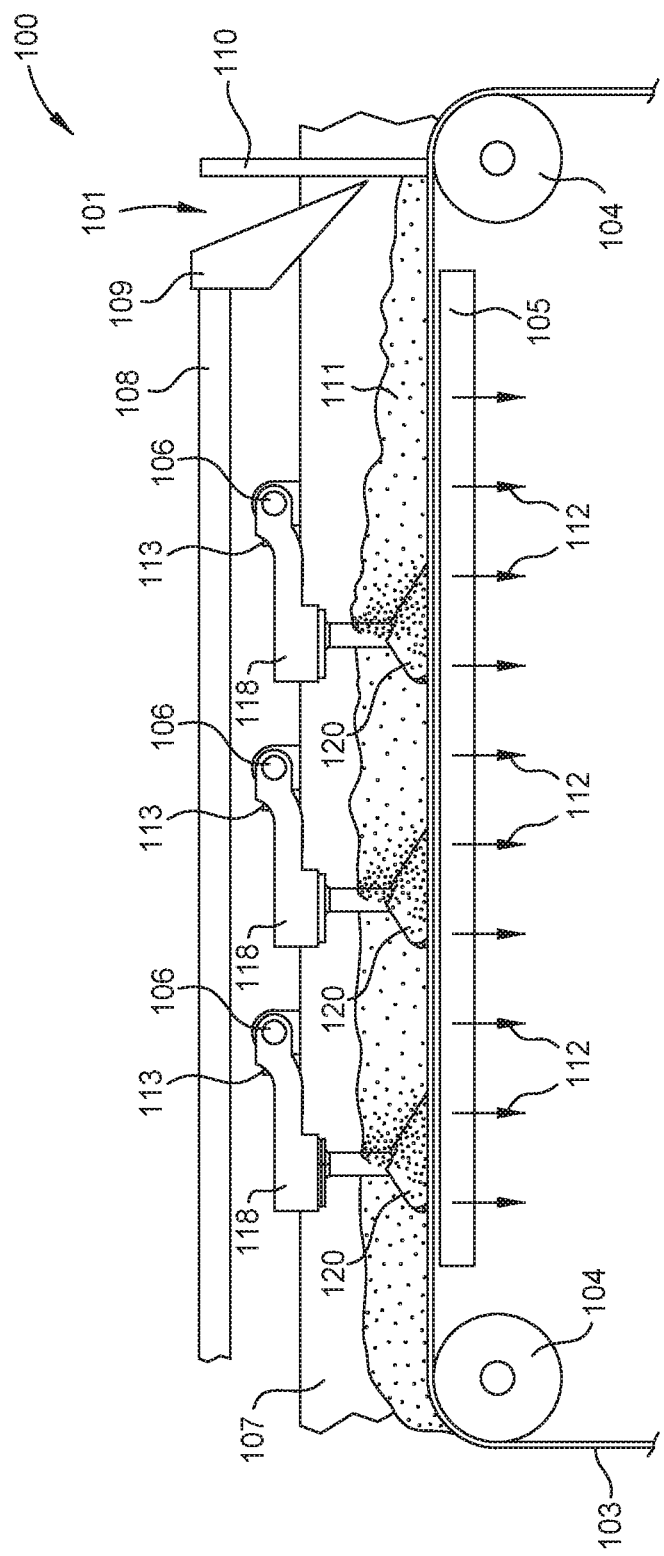
FIG. 1A is a schematic view of a sludge dewatering system, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to dewatering methods, systems, apparatus, and associated components thereof.

FIG. 1A is a schematic view of a sludge dewatering system 100, according to one implementation. The sludge dewatering system 100 includes a sludge injector 101, a perforated conveyor belt 103, and rollers 104. The sludge dewatering system 100 also includes a deck 105 (which may be referred to as a table) and rows of plows 120. The plows 120 are mounted on support rods 106 and between sidewalls 107. The sludge injector 101 is fluidly connected to a sludge source 108 that may include a pipeline to deliver sludge. The sludge injector 101 includes a tray 109 and a wall 110. Sludge 111 is delivered from the sludge source 108 and flows down the tray 109 and between the tray 109 and the wall 110. The sludge 111 drops between the tray 109 and the wall 110 and onto the perforated conveyor belt 103. The rollers 104 are used to move the perforated conveyor belt 103 in a counter-clockwise direction in FIG. 1A. The moving perforated conveyor belt 103 is used to flow a flow of sludge 111 past the rows of plows 120 and towards a sludge receiver opposite of the sludge injector 101.

The present disclosure contemplates that any sludge injector may be used and is not limited to the sludge injector 101 described. For example, a sludge inject may be used that includes a feed tank that is configured to fill up with sludge 111 and spill sludge 111 onto the perforated conveyor belt 103 up being filled to the top of the feed tank.

As the flow of sludge 111 flows past the plows 120 and towards the sludge receiver, the plows 120 disturb the flow of sludge 111 and a liquid phase 112 of the flow of sludge 111 falls vertically downward through perforations in the perforated conveyor belt 103 and through the deck 105. The liquid phase 112 is hence separated from solids of the flow of sludge 111. The liquid phase 112 includes water and may be composed mostly of water. In one example, the flow of sludge 111 includes sewage. The present disclosure contemplates that the sludge 111 described herein is not limited to sewage and may include any sludge that includes solids and liquid. For example, the sludge may include solids and liquids having food, wine, and/or materials used for oil and gas operations. The present disclosure contemplates that the sludge dewatering system 100 may be used to separate any liquid from any solid material.

The sludge 111 may include build-up of debris. The plows 120 are rotatable about the respective support rods 106, for example in a clockwise direction, until stopped by stops 113. The stops 113 include fasteners, such as bolts, threaded into the support rods 106. When build-up of debris contacts the plows 120, the plows may temporarily rotate in the clockwise direction until stopped by the stops 113, allowing the build-up of debris to pass underneath. The plows 120 are disposed in contact with the perforated conveyor belt 103 while the flow of sludge 111 flows past the plows 120. The plows 120 may temporarily move out of contact from the perforated conveyor belt 103, for example when build-up of debris flows underneath the plows 120.

Figure 1B:
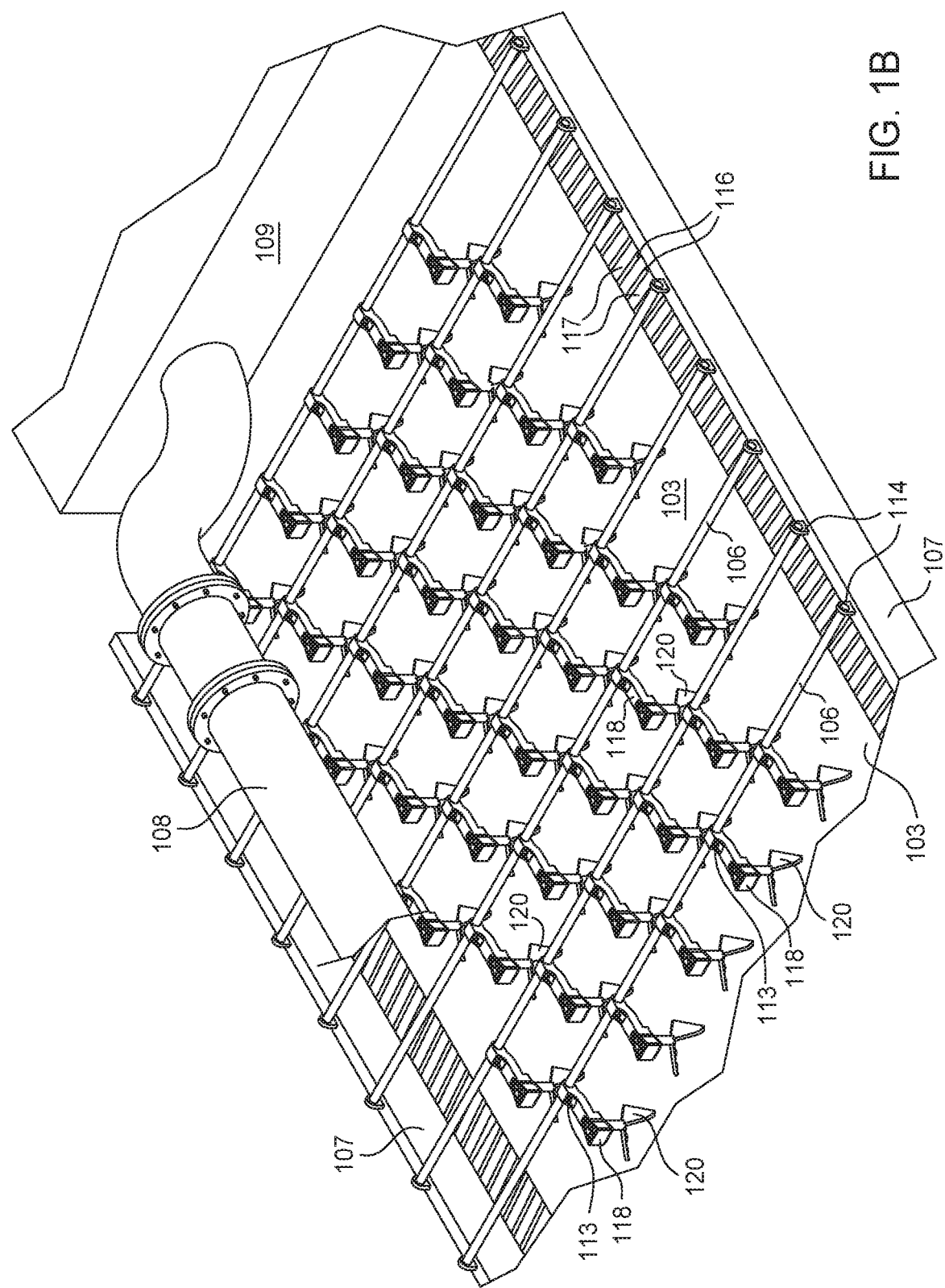
FIG. 1B illustrates a partial schematic isometric top view of the sludge dewatering system illustrated in FIG. 1A without sludge being injected, according to one implementation.

FIG. 1B illustrates a partial schematic isometric top view of the sludge dewatering system 100 illustrated in FIG. 1A without sludge 111 being injected, according to one implementation. The rows of plows 120 are mounted to support rods 106 and are between two sidewalls 107. The support rods 106 are mounted to mount bases 114 mounted above the sidewalls 107. Adjacent rows of plows 120 are offset from each other in a cross direction extending between the sidewalls 107, as illustrated in FIG. 1B. The deck 105 includes a plurality of cross bars 116 extending in the cross direction. The cross bars 116 support the perforated conveyor belt 103 and include openings 117 to allow the liquid phase 112 to fall vertically downward therethrough.

The plows 120 are mounted to the support rods 106 using plow holders 118. The plow holders 118 are rotatable until contacting the stops 113. The plow holders 118 include metal casting, for example steel casting. The plow holders 118 add weight to facilitate maintaining the plows 120 into engagement with the perforated conveyor belt 103 as sludge 111 flows into and past the plows 120.

Figure 2A:
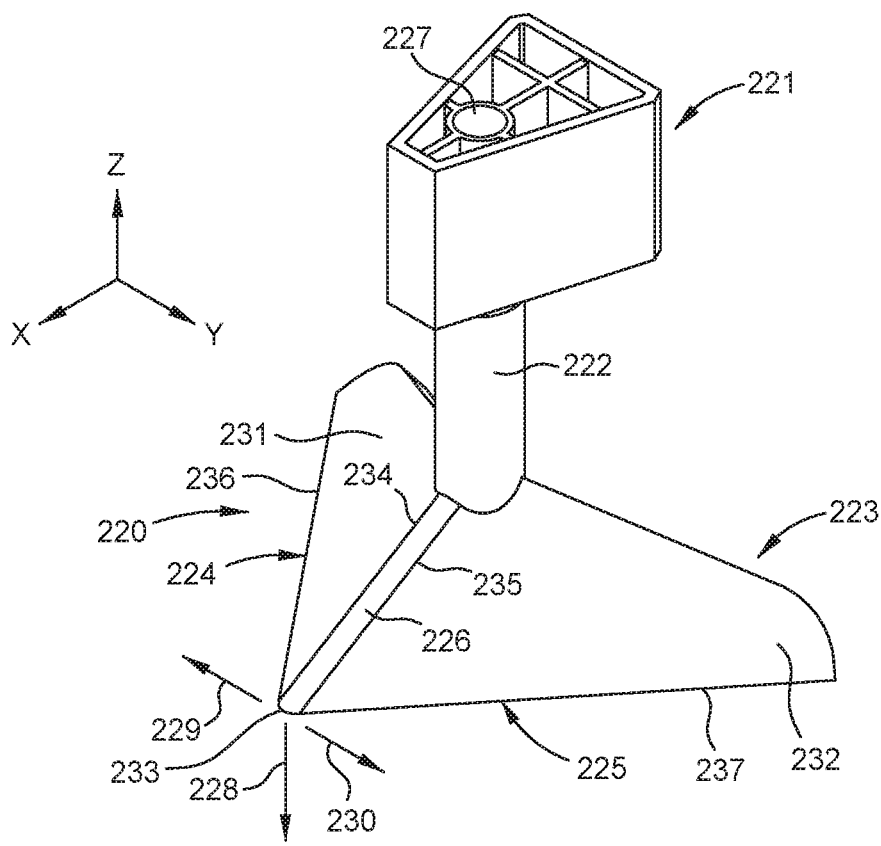
FIG. 2A illustrates a schematic isometric front view of a plow, according to one implementation.

FIG. 2A illustrates a schematic isometric front view of a plow 220, according to one implementation. The views of FIGS. 2A-2G, described here and below, include an X-axis, a Y-axis, and a Z-axis that define an X-Y plane, an X-Z plane, and a Y-Z plane. The plow 220 (which may be referred to as a chicane) may be used as each of the plows 120 illustrated in FIGS. 1A and 1B. The plow 220 includes a mounting boss 221, a blade 223, and a stem 222 connecting the mounting boss 221 to the blade 223. The mounting boss 221 is inserted into an opening of a corresponding plow holder (as is illustrated for the plows 120 and the plow holders 118 in FIGS. 1A and 1B). The mounting boss 221 is mounted into the plow holder using at least one of an interference fit and/or fasteners such as pins. A narrow end of the stem 222 is received into an opening 227 of the mounting boss 221.

The blade 223 includes a leading edge 226, a first wing 224, and a second wing 225. The first wing 224 is swept downward in a vertical direction 228 and outward in a first horizontal direction 229 relative to the leading edge 226. The second wing 225 is swept downward in the vertical direction 228 and outward in a second horizontal direction 230 relative to the leading edge 226. The second horizontal direction 230 is opposite of the first horizontal direction 229. The vertical direction 228 is parallel to the Z-axis and the first and second horizontal directions 229, 230 are parallel to the Y-axis. The leading edge 226, the first wing 224, and the second wing 225 intersect to form an apex 233 of the blade 223.

The first wing 224 includes an angled front surface 231. The angled front surface 231 of the first wing 224 angles downward in the vertical direction 228 and outward in the first horizontal direction 229 relative to the leading edge 226. The angled front surface 231 of the first wing 224 intersects the leading edge 226 at an inner edge 234 of the angled front surface 231. The angled front surface 231 of the first wing 224 includes an outer edge 236.

The second wing 225 includes an angled front surface 232. The angled front surface 232 of the second wing 225 angles downward in the vertical direction 228 and outward in the second horizontal direction 230 relative to the leading edge 226. The angled front surface 232 of the second wing 225 intersects the leading edge 226 at an inner edge 235 of the angled front surface 232. The angled front surface 232 of the second wing 225 includes an outer edge 237.

The blade 223 of the plow 220 includes at least one angled front surface (FIG. 2A illustrates two angled front surfaces 231, 232). The leading edge 226 includes a curved surface disposed at an angle relative to a horizontal plane (the X-Y plane). The leading edge 226 may include a planar surface disposed at an angle relative to a horizontal plane (the X-Y plane). The leading edge 226 may include a sharp edge defined by an intersection of the angled front surface 231 of the first wing 224 and the angled front surface 232 of the second wing 225.

Figure 2B:
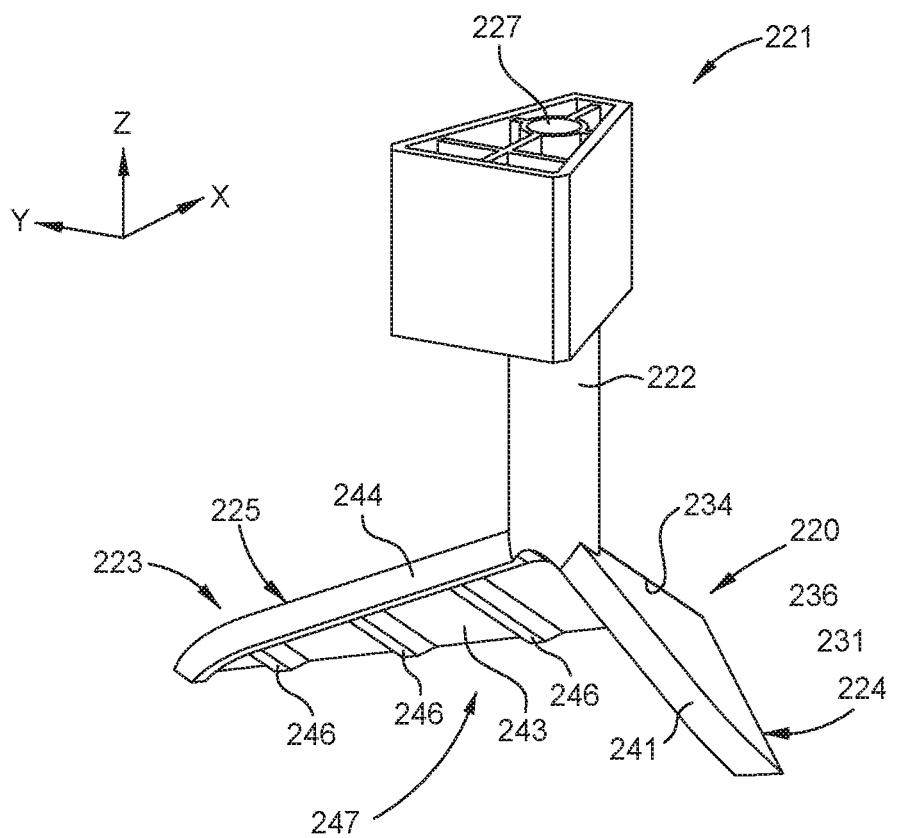
FIG. 2B illustrates a schematic isometric back view of the plow illustrated in FIG. 2A, according to one implementation.

FIG. 2B illustrates a schematic isometric back view of the plow 220 illustrated in FIG. 2A, according to one implementation.

Figure 2C:
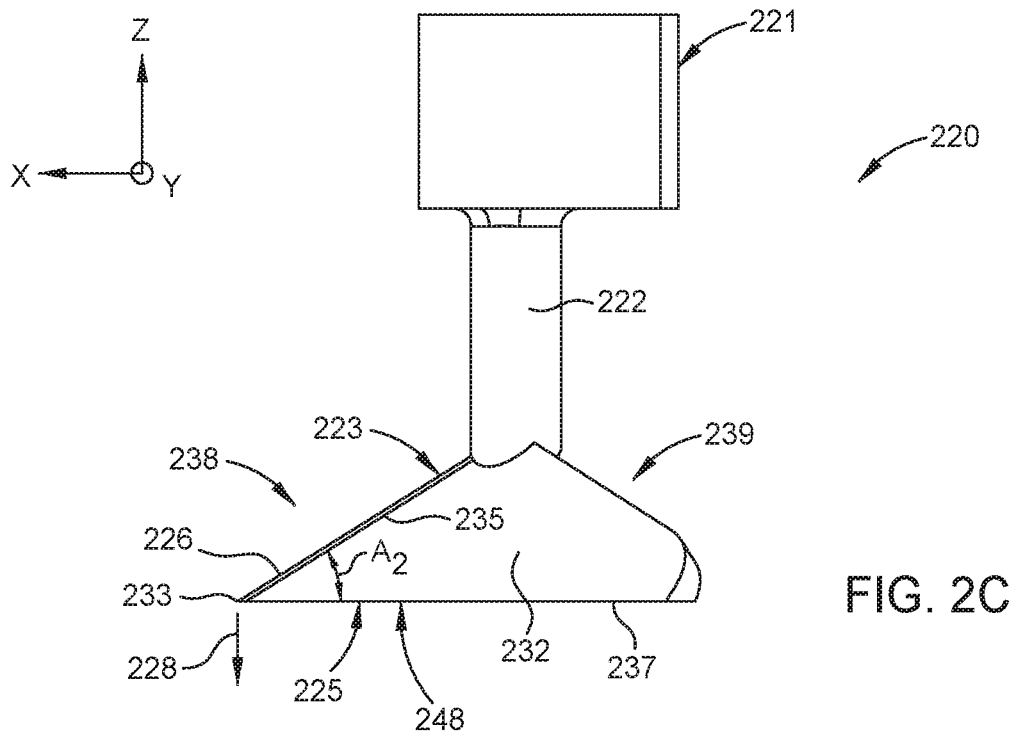
FIG. 2C illustrates a schematic side view of the plow illustrated in FIGS. 2A and 2B, according to one implementation.

FIG. 2C illustrates a schematic side view of the plow 220 illustrated in FIGS. 2A and 2B, according to one implementation. The blade 223 includes a leading side 238 and a trailing side 239 opposite of the leading side 238. The blade 223 also includes a bottom side 248. The leading edge 226, the angled front surface 231 of the first wing 224, and the angled front surface 232 of the second wing 225 are disposed on the leading side 238 of the blade 223. The X-axis extends in a direction between the leading side 238 and the trailing side 239.

The angled front surface 231 of the first wing 224 and the angled front surface 232 of the second wing 225 each angle downward in the vertical direction 228 to define a second angle $A_2$ (a vertical angle) in a vertical plane (the X-Z plane). A first angle $A_1$ is discussed below in reference to FIG. 2E. For the angled front surface 231 of the first wing 224, the second angle $A_2$ is measured in the X-Z plane between the outer edge 236 and the inner edge 234 of the angled front surface 231. For the angled front surface 232 of the second wing 225, the second angle $A_2$ is measured in the X-Z plane between the outer edge 237 and the inner edge 235 of the angled front surface 232. Hence, each angled front surface 231, 232 of the first wing 224 and the second wing 225 defines a second angle $A_2$ measured between the outer edge 236 or 237 and the inner edge 234 or 235 of each respective angled front surface 231 or 232 in the X-Z plane.

In one embodiment, which can be combined with other embodiments, the second angle $A_2$ is within a range of 15 degrees to 70 degrees, such as 25 degrees to 45 degrees. In one example, the second angle $A_2$ is within a range of 30 degrees to 35 degrees. In one example, the second angle $A_2$ is 32 degrees.

Figure 2D:
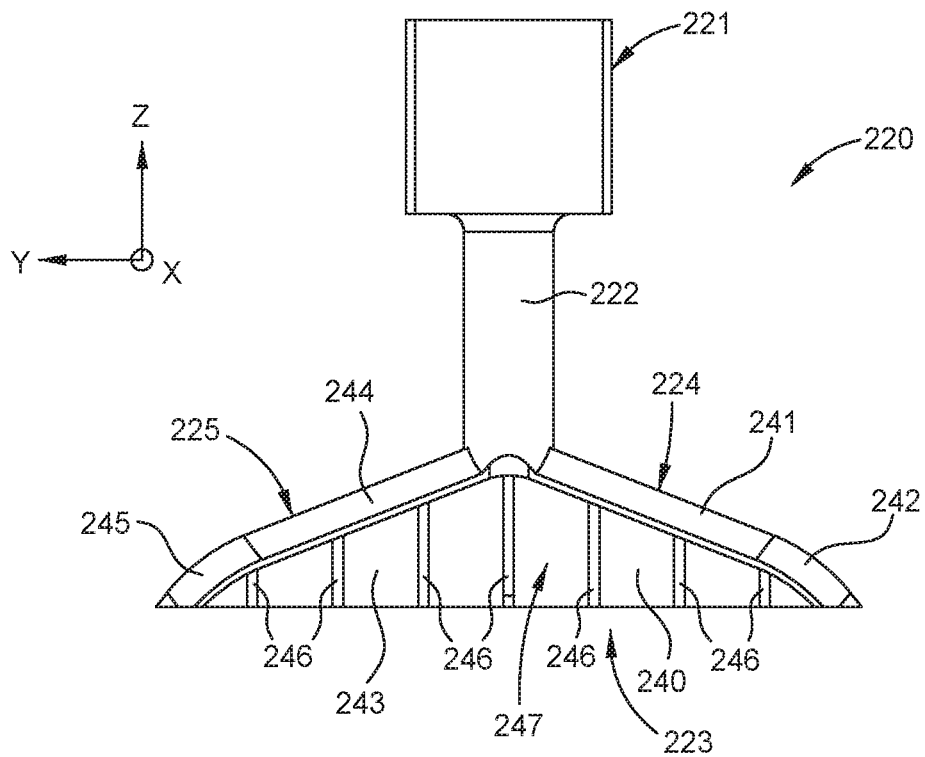
FIG. 2D illustrates a schematic back view of the plow illustrated in FIGS. 2A-2C, according to one implementation.

FIG. 2D illustrates a schematic back view of the plow 220 illustrated in FIGS. 2A-2C, according to one implementation. The first wing 224 includes an angled back surface 240, a trailing edge 241, and a rounded edge 242 disposed on the trailing side 239 of the blade 223. The second wing 225 includes an angled back surface 243, a trailing edge 244, and a rounded edge 245 disposed on the trailing side 239. The first wing 224 and the second wing 225 include a sheet or skin of material, such as a polymeric material. In one example the polymeric material includes a plastic material, such as one or more of acrylonitrile butadiene styrene (ABS), polyvinyl chloride (PVC), fiberglass, and/or a plastic composite material. The plow 220 having the mounting boss 221, the stem 222, and the blade 223 may be injection-molded and/or 3-D printed. The polymeric material of the plow 220 facilitates manufacturing the plow 220 using forming, injection-molding, and/or 3-D printing, which facilitates lower costs and ease of manufacturing of the plow 220.

The blade 223 includes a plurality of ribs 246 disposed on the angled back surface 240 of the first wing 224 and the angled back surface 243 of the second wing 225. The plurality of ribs 246 are disposed on the trailing side 239 of the blade 223. The ribs 246 structurally support and provide rigidity to the first wing 224 and the second wing 225. The ribs 246 also facilitate breaking up surface tension of water to facilitate draining of water downwards through the perforated conveyor belt 103 shown in FIGS. 1A-1B. The blade 223 includes a cavity 247 on the trailing side 239 of the blade 223. The cavity 247 is formed in the bottom side 248 and the trailing side 239 of the blade 223. The cavity 247 is behind the angled back surface 240 of the first wing 224 and the angled back surface 243 of the second wing 225. The cavity 247 is also between, and underneath, the angled back surface 240 of the first wing 224 and the angled back surface 243 of the second wing 225. The cavity 247 may be at least partially underneath the trailing edge 241 and the rounded edge 242 of the first wing 224. The cavity 247 may be at least partially underneath the trailing edge 244 and the rounded edge 245 of the second wing 225. The ribs 246 protrude at least partially into the cavity 247 from the angled back surface 240 of the first wing 224 and the angled back surface 243 of the second wing 225.

Figure 2E:
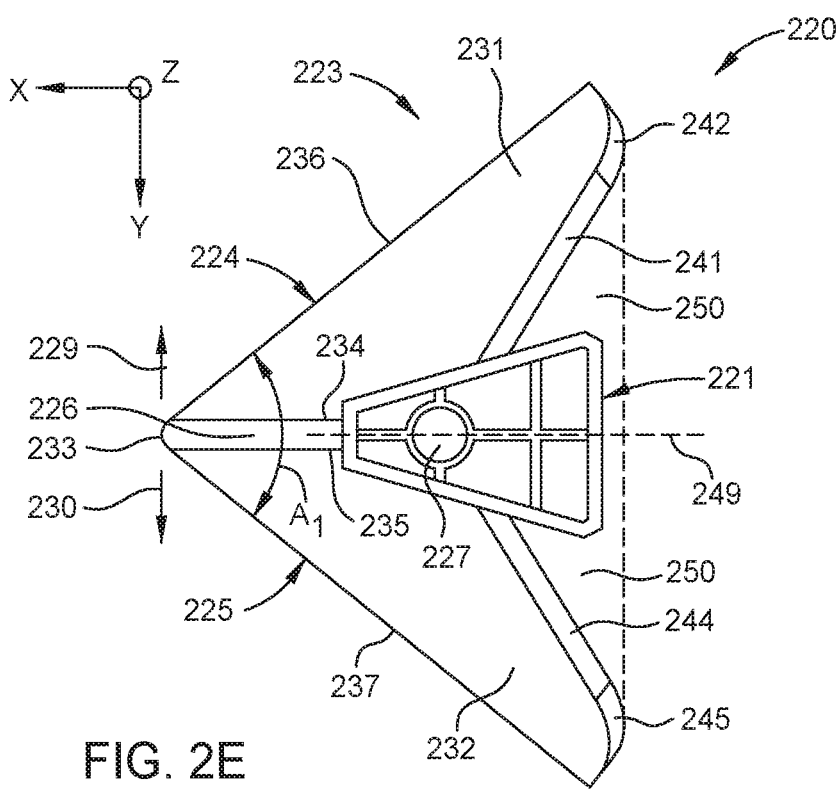
FIG. 2E illustrates a schematic top view of the plow illustrated in FIGS. 2A-2D, according to one implementation.

FIG. 2E illustrates a schematic top view of the plow 220 illustrated in FIGS. 2A-2D, according to one implementation. The angled front surface 231 angles outward in the first horizontal direction 229 and the angled front surface 232 angles outward in the second horizontal direction 230 to define a first angle $A_1$ (a horizontal angle) in a horizontal plane (the X-Y plane). The first angle $A_1$ is measured in the X-Y plane between the outer edge 236 of the angled front surface 231 of the first wing 224, and the outer edge 237 of the angled front surface 232 of the second wing 225

In one embodiment, which can be combined with other embodiments, the first angle $A_1$ is within a range of 45 degrees to 90 degrees, such as 60 degrees to 90 degrees. In one example, the first angle $A_1$ is within a range of 80 degrees to 85 degrees. In one example, the first angle $A_1$ is 82 degrees. In one example, the first angle $A_1$ is 83 degrees.

Each of the angled front surface 231 and the angled front surface 232 angles outward relative to the leading edge to define an angle in the X-Y plane relative to a center axis 249 of the leading edge 226. The angle of each of the angled front surface 231 and the angled front surface 232 is equal to half of the first angle $A_1$.

The blade 223 includes a gap 250 on the trailing side 239 of the blade 223. The gap 250 is at least partially between the trailing edge 241 of the first wing 224 and the trailing edge 244 of the second wing 225. The gap 250 is at least partially between the rounded edge 242 of the first wing 224 and the rounded edge 245 of the second wing 225.

Figure 2F:
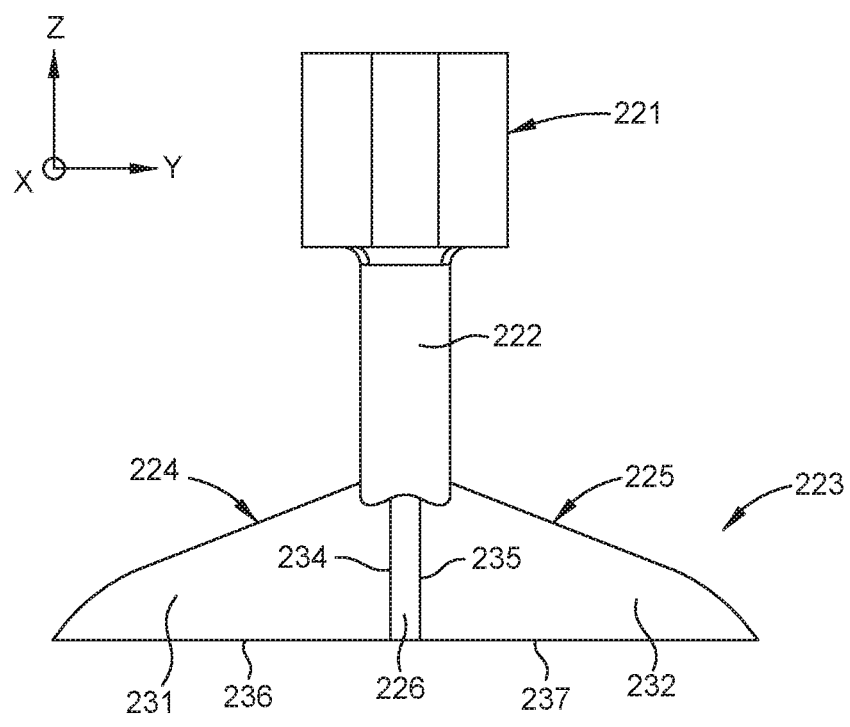
FIG. 2F illustrates a schematic front view of the plow illustrated in FIGS. 2A-2E, according to one implementation.

FIG. 2F illustrates a schematic front view of the plow 220 illustrated in FIGS. 2A-2E, according to one implementation.

Figure 2G:
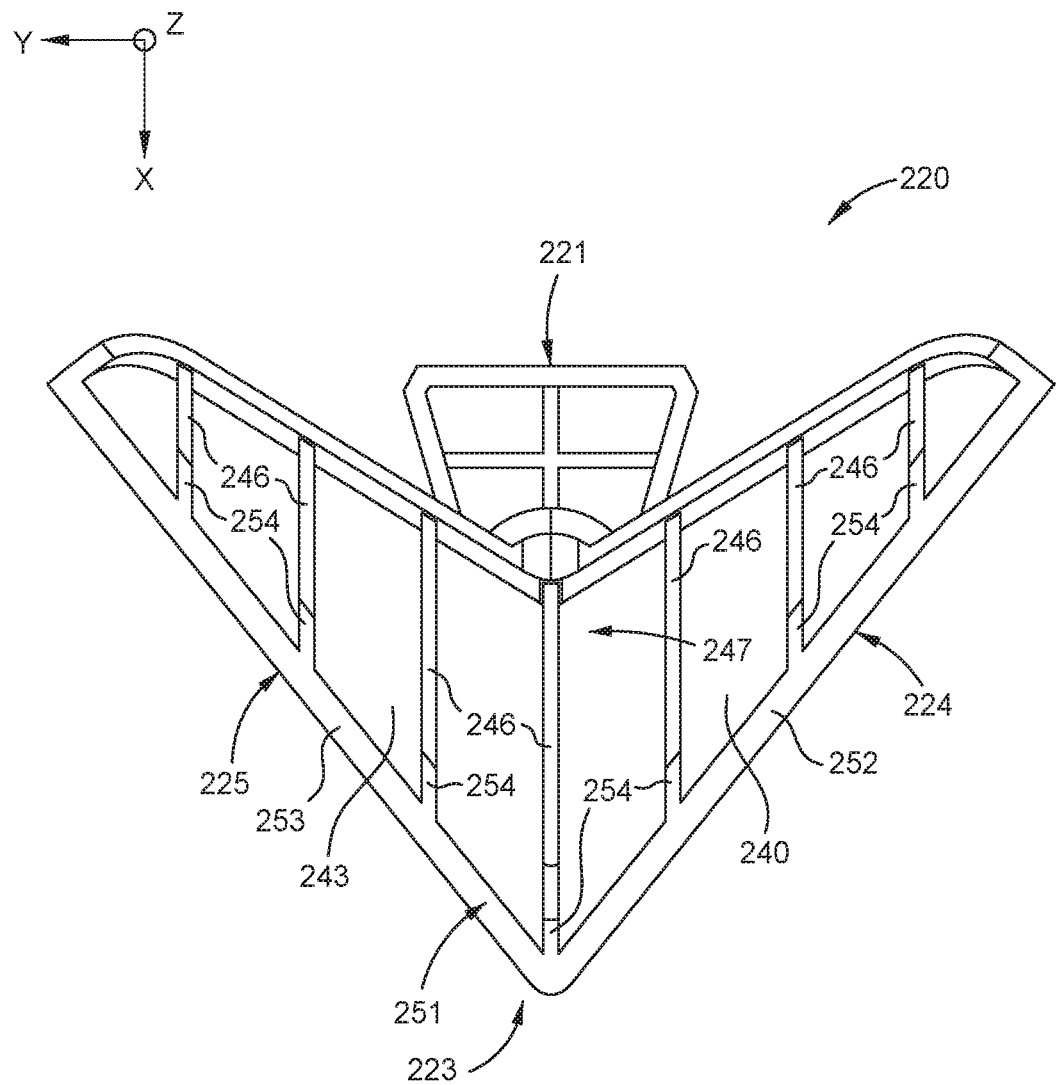
FIG. 2G illustrates a schematic bottom view of the plow illustrated in FIGS. 2A-2F, according to one implementation.

FIG. 2G illustrates a schematic bottom view of the plow 220 illustrated in FIGS. 2A-2F, according to one implementation. The blade 223 of the plow 220 includes one or more contact surfaces 251 (one is shown in FIG. 2G) to contact the perforated conveyor belt 103 during operation of the sludge dewatering system 100.

The first wing 224 includes a bottom surface 252 and the second wing 225 includes a bottom surface 253. The bottom surface 252 of the first wing 224 and the bottom surface 253 of the second wing 225 are coplanar with each other. Each rib 246 of the plurality of ribs 246 includes a bottom surface rib 246 that is coplanar with the bottom surface 252 of the first wing 224 and the bottom surface 253 of the second wing 225. The bottom surface 254 of each rib 246, the bottom surface 252 of the first wing 224, and the bottom surface 253 of the second wing 225 form the one or more contact surfaces 251 of the blade 223.

Figure 3A:
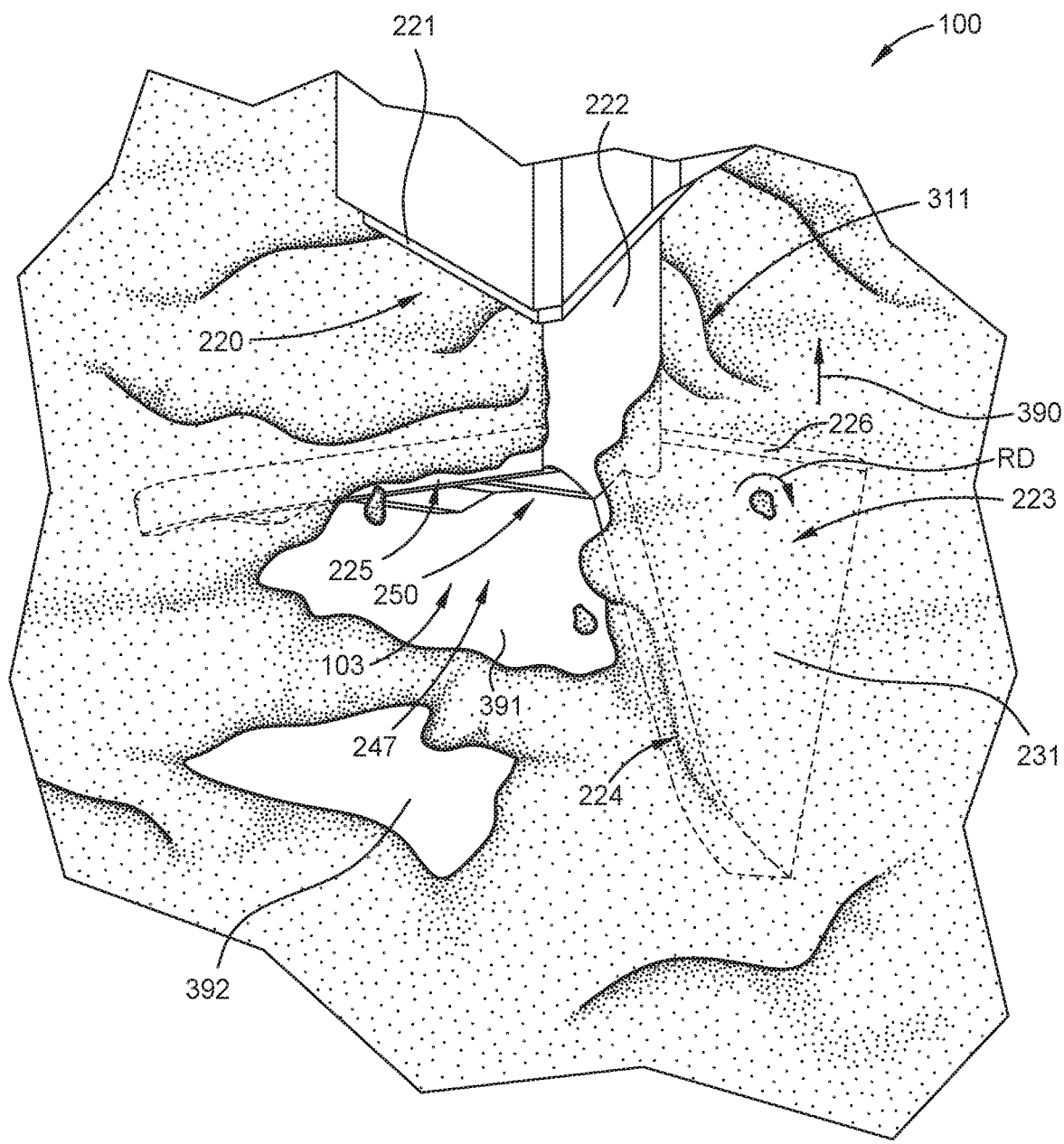
FIG. 3A is a schematic isometric back view of the plow illustrated in FIGS. 2A-2G being used during operation of the sludge dewatering system illustrated in FIGS. 1A and 1B, according to one implementation.

FIG. 3A is a schematic isometric back view of the plow 220 illustrated in FIGS. 2A-2G being used during operation of the sludge dewatering system 100 illustrated in FIGS. 1A and 1B, according to one implementation. During operation of the sludge dewatering system 100, a flow of sludge 311 is flowed into the leading side 238 of the plow 220 using the perforated conveyor belt 103. The flow of sludge 311 is flowed into the leading edge 226, into the angled front surface 231 of the first wing 224, and into the angled front surface 232 of the second wing 225. The leading edge 226, the angled front surface 231, and the angled front surface 232 flow the sludge 311 from the perforated conveyor belt 103 and upwards along the leading edge 226, the first wing 224, and the second wing 225. The leading edge 226, the angled front surface 231, and the angled front surface 232 direct sludge 311 upwards in a vertical direction 390. The leading edge 226, the angled front surface 231, and/or the angled front surface 232 also direct sludge 311 outwards in the first horizontal direction 229 and/or the second horizontal direction 230. Sludge 311 may also flow past an outer surface of the stem 222. The sludge 311 then flows past the trailing edge 241 and the rounded edge 242 of the first wing 224, dropping downwards from the angled front surface 231 and back to the perforated conveyor belt 103. The sludge 311 also flows past the trailing edge 244 and the rounded edge 245 of the second wing 225, dropping downwards from the angled front surface 232 and back to the perforated conveyor belt 103. The sludge 311 drops onto the perforated conveyor belt 103 on the trailing side 239 of the blade 223 of the plow 220. A portion of the sludge 311 may drop through the gap 250 as the sludge 311 drops back to the perforated conveyor belt 103. Hence, the sludge 311 flows from the leading side 238 to the trailing side 239 of the blade 223 of the plow 220.

As the sludge 311 flows from the leading side 238 to the trailing side 239 of the plow 220, an area 391 of the perforated conveyor belt 103 is free from solid portions of the sludge 311 (e.g., the area 391 is visible under the blade 223). The area 391 of the perforated conveyor belt 103 kept free from solid portions of sludge 311 facilitates liquid (e.g., water) flowing downwards through the perforated conveyor belt 103 and separating from the solids of the sludge 311. At least a portion 392 of the area 391 may be kept free from solid portions of the sludge 311 as the area 391 moves downstream from the plow 220 to facilitate effective and efficient separation of water from the sludge 311.

During operation of the sludge dewatering system 100, the one or more contact surfaces 251 that include the bottom surfaces 252-254 are maintained in contact with the perforated conveyor belt 103 as the flow of sludge 311 flows into and over the blade 223 of the plow 220. The cavity 247 is between the angled back surface 240 of the first wing 224, the angled back surface 243 of the second wing 225, and the perforated conveyor belt 103 during operation of the sludge dewatering system 100, as illustrated in FIG. 3A.

Figure 3B:
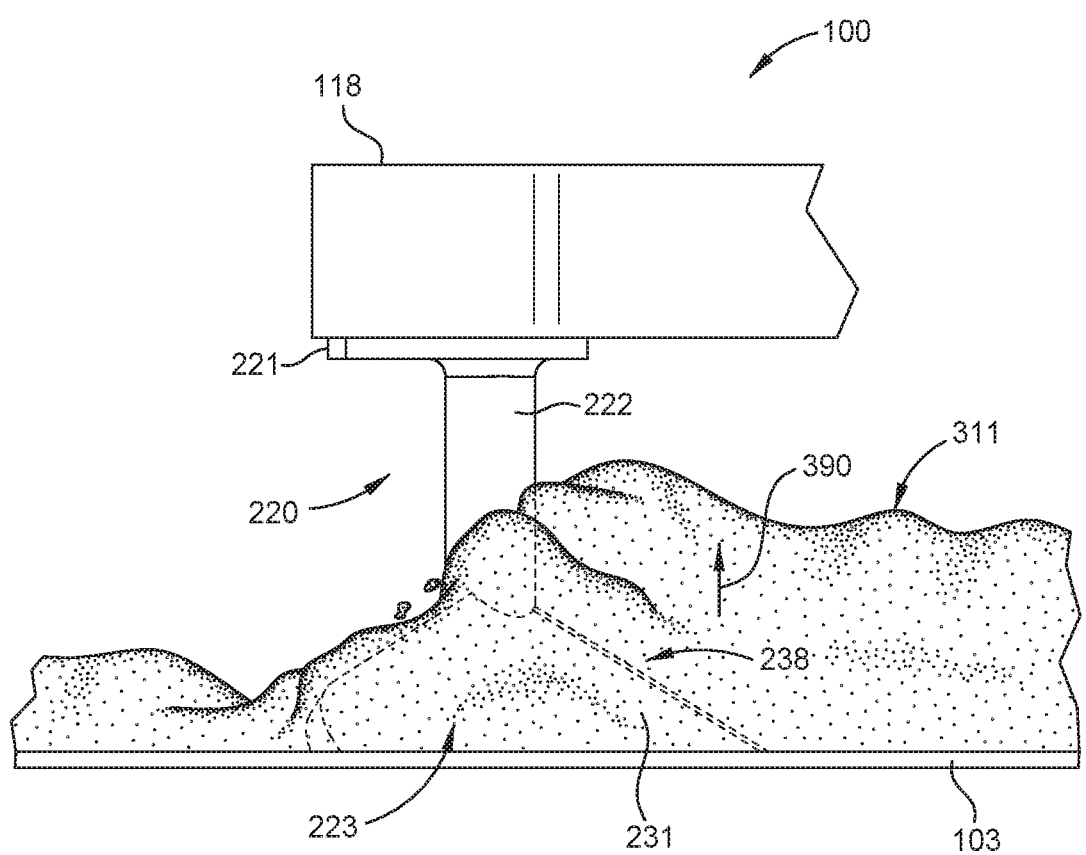
FIG. 3B is a schematic side view of the plow being used during operation of the sludge dewatering system in FIG. 3A, according to one implementation.

FIG. 3B is a schematic side view of the plow 220 being used during operation of the sludge dewatering system 100 in FIG. 3A, according to one implementation. The perforated conveyor belt 103 moves in a direction from the leading side 238 to the trailing side 239 to flow sludge 311 into the leading side 238. One or more portions of the sludge 311 turn over as the portions of sludge 311 flow from the leading side 238 to the trailing side 239 of the plow 220. In one example, one or more portions of the sludge 311 rotate in a rotational direction RD as the one or more portions of the sludge 311 flow from the leading side 238 to the trailing side 239. One or more portions of the sludge 311 turn over as the one or more portions (1) flow along the leading edge 226 and/or the angled front surfaces 231, 232; (2) flow past the stem 222; (3) flow past the trailing edges 241, 244; and/or (4) drop from the blade 223 to the perforated conveyor belt 103. In one example, one or more portions of the sludge 311 rotate in the rotational direction RD to turn over as the one or more portions flow along the angled front surface 231 of the first wing 224 and/or the angled front surface 232 of the second wing 225. The one or more portions of the sludge 311 rotate about the X-axis in the rotational direction RD to turn over, as illustrated in FIG. 3A. In one example, one or more portions of the sludge 311 flowing along the angled front surface 231 rotate in the rotational direction RD that is a clockwise direction (as shown in FIG. 3A) and the one or more portions flowing along the angled front surface 232 rotate in a counter-clockwise direction to turn over. The rotational direction RD is in the Y-Z plane.

Aspects of the plow 220, including but not limited to a polymeric material, the swept first wing 224 the swept second wing 225, the cavity 247, the ribs 246, the bottom surfaces 252-254, the first angle $A_1$, and the second angle $A_2$, facilitate keeping a larger area of the perforated conveyor belt 103 clear of sludge 311 solids. Keeping a large area of the perforated conveyor belt 103 clear of sludge 311 solids provides more area of the perforated conveyor belt 103 for water to drain downwards, facilitating effective and efficient separation of water from solids of the sludge 311.

Such aspects of the plow 220 also facilitate turning over the sludge 311 as it flows from the leading side 238 to the trailing side 239. Turning over the sludge 311 has been found to facilitate effective and efficient separation of water from solids of the sludge 311. The turning over of the sludge 311 promotes effective and efficient separation of water when compared to situations where the sludge 311 is moved vertically or horizontally without turning over.

Additionally, such aspects of the plow 220 facilitate effectively and efficiently breaking up surface tension of water in the sludge 311 to facilitate effective and efficient draining of water downward through the perforated conveyor belt 103.

The aspects of the plow 220 also facilitate effectively and efficiently dewatering sludge 311 by introducing more turbulence into the flow of sludge 311 without reducing or increasing the overall size of the perforated conveyor belt 103.

The ranges and the examples of the first angle $A_1$ and the second angle $A_2$ described above facilitate effectively and efficiently separating water from sludge 311 solids without backing up sludge 311 on the leading side 238 of the plow 220 such that flow of the sludge 311 is stopped or impeded because the sludge 311 does not drop from the blade 223 and onto the perforated conveyor belt 103.

Aspects of the plow 220 also facilitate lower costs and ease of manufacturing of the plow 220.

It is contemplated that one or more of the aspects disclosed herein may be combined. Moreover, it is contemplated that one or more of the aspects disclosed herein may include some or all of the aforementioned benefits.

Aspects of the present disclosure can be expressed in one or more of the following examples.

Example 1 includes a method of dewatering a flow of sludge. The method includes flowing, using a perforated conveyor belt, sludge into a leading side of a plow. The leading side of the plow includes a leading edge, a first angled front surface, and a second angled front surface. The method also includes flowing the sludge from the perforated conveyor belt and upward along the first angled front surface and the second angled front surface of the plow. The method also includes flowing the sludge past one or more trailing edges of the plow, and dropping the sludge onto the perforated conveyor belt on a trailing side of the plow.

Example 2 includes the method of Example 1, and the sludge is turned over in flowing from the leading side of the plow to the trailing side of the plow.

Example 3 includes the method of Example 1, and the method also includes maintaining one or more bottom surfaces of the plow in contact with the perforated conveyor belt.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A sludge dewatering apparatus comprising a plow, the plow comprising:
   a stem,
   a blade disposed below the stem in a first axial direction extending from the stem and to the blade, the blade comprising:
      a leading edge,
      a first wing swept away from the stem in the first axial direction and outward in a second axial direction relative to the leading edge, the second axial direction extending perpendicularly to the first axial direction, and a second wing swept away from the stem in the first axial direction and outward in a third axial direction relative to the leading edge, the third axial direction extending perpendicularly to the first axial direction and being opposite of the second axial direction.

2. The sludge dewatering apparatus of claim 1, wherein the leading edge comprises a sharp edge or a curved surface disposed at an angle relative to a plane that is perpendicular to the first axial direction.

3. The sludge dewatering apparatus of claim 1, wherein:
the first wing comprises an angled front surface that angles away from the stem in the first axial direction and outward in the second axial direction relative to the leading edge; and
the second wing comprises an angled front surface that angles away from the stem in the first axial direction and outward in the third axial direction relative to the leading edge.

4. The sludge dewatering apparatus of claim 3, wherein the leading edge is on a leading side of the blade, and the blade further comprises a cavity on a trailing side of the blade that is behind the first wing and the second wing, and between the first wing and the second wing.

5. The sludge dewatering apparatus of claim 3, wherein an outer edge of the angled front surface of the first wing and an outer edge of the angled front surface of the second wing define a first angle measured therebetween in a first plane that is perpendicular to the first axial direction, the first angle being within a range of 45 degrees to 90 degrees.

6. The sludge dewatering apparatus of claim 5, wherein each angled front surface of the first wing and the second wing defines a second angle measured between the outer edge and an inner edge of each respective angled front surface in a second plane that is parallel to the first axial direction, the second angle being within a range of 15 degrees to 70 degrees.

7. The sludge dewatering apparatus of claim 3, wherein the first wing comprises a trailing edge, and the second wing comprises a trailing edge.

8. The sludge dewatering apparatus of claim 7, wherein the first wing comprises an angled back surface and a bottom surface, and the second wing comprises an angled back surface and a bottom surface.

9. The sludge dewatering apparatus of claim 8, further comprising a plurality of ribs disposed on the angled back surface of the first wing and the angled back surface of the second wing.

10. The sludge dewatering apparatus of claim 9, wherein:
each rib of the plurality of ribs comprises a bottom surface that is coplanar with the bottom surface of the first wing and the bottom surface of the second wing.

11. A sludge dewatering apparatus comprising a plow, the plow comprising:
a stem,
a blade disposed below the stem in a first axial direction extending from the stem and to the blade, the blade comprising:
a leading edge,
a first angled front surface,
a second angled front surface, each of the first angled front surface and the second angled front surface angling outward in a second axial direction and a third axial direction, respectively, relative to a center axis of the leading edge to define a first angle in a first plane that is perpendicular to the first axial direction, the second axial direction extending perpendicularly to the first axial direction, and the third axial direction extending perpendicularly to the first axial direction and being opposite of the second axial direction,
each of the first angled front surface and the second angled front surface angling away from the stem in the first axial direction relative to the leading edge to define a second angle in a second plane that is parallel to the first axial direction,
the first angle being within a range of 45 degrees to 90 degrees, and
the second angle being within a range of 15 degrees to 70 degrees.

12. The sludge dewatering apparatus of claim 11, wherein the leading edge comprises a sharp edge or a curved surface disposed at an angle relative to the first plane.

13. The sludge dewatering apparatus of claim 11, wherein the blade further comprises a trailing edge.

14. The sludge dewatering apparatus of claim 13, wherein the first angled front surface and the second angled front surface are disposed on a leading side of the blade, and the blade comprises an angled back surface on a trailing side of the blade.

15. The sludge dewatering apparatus of claim 14, further comprising a plurality of ribs disposed on the angled back surface of the blade.

16. The sludge dewatering apparatus of claim 14, wherein the second angle of each of the first angled front surface and the second angled front surface is measured between an inner edge and an outer edge of the respective first angled front surface or second angled front surface.

17. The sludge dewatering apparatus of claim 16, wherein the second angle is within a range of 25 degrees to 45 degrees.

18. A sludge dewatering apparatus comprising a plow, the plow comprising:
a stem,
a blade disposed below the stem in a first axial direction extending from the stem and to the blade, the blade comprising:
a leading edge on a leading side of the blade,
a first wing comprising an angled back surface angling away from the stem in the first axial direction and outward in a second axial direction extending perpendicularly to the first axial direction,
a second wing comprising an angled back surface angling away from the stem in the first axial direction and outward in a third axial direction extending perpendicularly to the first axial direction and being opposite of the second axial direction, and
a cavity on a trailing side of the blade that is behind the first wing and the second wing, and between the first wing and the second wing.

19. The sludge dewatering apparatus of claim 18, wherein the cavity is behind the angled back surface of the first wing and the angled back surface of the second wing, and between the angled back surface of the first wing and the angled back surface of the second wing.

20. The sludge dewatering apparatus of claim 19, wherein the first wing comprises an angled front surface on the leading side and the second wing comprises an angled front surface on the leading side.

21. A plow for a sludge dewatering system, comprising:
a stem, a blade disposed below the stem in a first axial direction extending from the stem and to the blade, the blade comprising:
a leading edge,
a first wing swept away from the stem in the first axial direction and outward in a second axial direction relative to the leading edge, the second axial direction extending perpendicularly to the first axial direction, and
a second wing swept away from the stem in the first axial direction and outward in a third axial direction relative to the leading edge, the third axial direction extending perpendicularly to the first axial direction and being opposite of the second axial direction, the first wing and the second wing including a polymeric material.

* * * * *